(12) United States Patent
VanderKamp et al.

(10) Patent No.: US 8,723,696 B1
(45) Date of Patent: May 13, 2014

(54) LOCATION INFORMATION GENERATION SYSTEM, DEVICE, AND METHOD

(75) Inventors: Travis S. VanderKamp, Marion, IA (US); David A. Frank, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 113 days.

(21) Appl. No.: 13/567,482

(22) Filed: Aug. 6, 2012

(51) Int. Cl.
G08C 23/00 (2006.01)
G01C 23/00 (2006.01)
G08G 5/00 (2006.01)

(52) U.S. Cl.
CPC .............. G01C 23/00 (2013.01); *G08G 5/0021* (2013.01)
USPC ........... 340/971; 340/945; 340/967; 340/974; 340/975; 701/3; 701/16; 701/436; 701/467

(58) Field of Classification Search
CPC .............................. G01C 23/00; G08G 5/0021
USPC ........ 340/971, 945, 967, 974, 975; 701/3, 16, 701/436, 467
See application file for complete search history.

(56) References Cited

U.S. PATENT DOCUMENTS

| 8,099,234 B1 | 1/2012 | Frank et al. | |
| 2005/0137758 A1* | 6/2005 | He et al. | 701/3 |
| 2009/0248297 A1* | 10/2009 | Feyersisen et al. | 701/206 |

OTHER PUBLICATIONS

U.S. Appl. No. 12/462,969, filed Aug. 11, 2009, McCusker.

\* cited by examiner

*Primary Examiner* — Tai T Nguyen
(74) *Attorney, Agent, or Firm* — Donna P. Suchy; Daniel M. Barbieri

(57) ABSTRACT

Present novel and non-trivial system, device, and method for generating location information presented to a pilot are disclosed. A processing unit is configured to receive manual input data representative of one or more selected image location(s) on a first image data set; determine a selected geographic location for each selected image location; and update the second image data set to include location pointer data. As embodied herein, first and second images represented in the first and second image data sets, respectively, could be displayed simultaneously on the same display unit or separately on different display units. Also, the first image and second image could correspond to an egocentric view and a plan view, respectively, or vice-versa. Additionally, the first image data set and/or second image data set could be updated include first and/or second location pointer data, respectively.

20 Claims, 10 Drawing Sheets

(12) United States Patent

LOCATION INFORMATION GENERATION SYSTEM, DEVICE, AND METHOD

BACKGROUND OF THE INVENTION

1. Field of the Invention

This invention pertains generally to the field of vehicle display units that present navigation information to the user of a vehicle such as the pilot of an aircraft.

2. Description of the Related Art

Terrain formats on aircraft flight displays based upon traditional enhanced ground proximity warning systems typically depict a two-dimensional representation of local ground terrain for the purpose of navigation around potential terrain threats. By comparison, a Synthetic Vision System ("SVS") may provide a three-dimensional, perspective view of a scene outside the aircraft, providing graphical imagery for geographic and man-made features such as terrain, obstacles, and runways in the immediate vicinity of the aircraft.

The topographical map and the SVS depictions of the local terrain, however, may appear quite dissimilar because one may be a two-dimensional "plan" view (i.e., looking down at the local terrain) and the other may be a three-dimensional "egocentric" view. As such, this may make the pilot mentally correlate information from one depiction with the information presented in the other depiction. For example, terrain features (or other features) that are located in one image may not be readily identifiable in a second image. As a result, the pilot could be easily confused and lose situational awareness when trying to identify the same location in two dissimilar images.

BRIEF SUMMARY OF THE INVENTION

The embodiments disclosed herein present at least one novel and non-trivial system, device, and method for generating location information. By generating location information of the same location in two dissimilar images, the pilot's situational awareness may be enhanced.

In one embodiment, a system for generating location information is disclosed. The system may be comprised of a manual input data source, a first display unit for presenting a first image represented in a first image data set, a second display unit for presenting a second image represented in a second image data set, and a processing unit configured to update the second image data set with first location pointer data. In an additional embodiment, the processor could also be configured to update the first image data set with second location pointer data.

In another embodiment, a device for generating location information is disclosed, where such device could be the processing unit configured to update the second image data set to include first location pointer data based upon input data received via the manual input source. The input data could be representative of one or more selected image locations of the first image data set. The updated second image data set could be representative of a second image in which one or more first location pointers point to the location(s) of one or more selected locations of the first image. In another embodiment, the first image data set could be updated to include second location pointer data, where the updated first image data set could be representative of a first image in which one or more second location pointers point to the location(s) of one or more selected locations of the first image.

In another embodiment, a method for generating location information is disclosed, where such method could be performed by the processing unit. When properly configured, the processing unit may receive input data via the source of manual input data representative of at least one selected image location; determine a selected geographic location for each selected image location; and update the second image data set to include first location pointer data. In an additional embodiment, the processing may update the first image data set to include second location pointer data.

BRIEF DESCRIPTION OF THE DRAWINGS

The drawings of FIG. 1 depict a functional block diagram of a system for generating location information based upon a pilot's selection.

DETAILED DESCRIPTION OF THE INVENTION

In the following description, several specific details are presented to provide a complete understanding of embodiments of the invention. One skilled in the relevant art will recognize, however, that the invention can be practiced without one or more of the specific details or in combination with other components. In other instances, well-known implementations or operations are not shown or described in detail to avoid obscuring aspects of various embodiments of the invention.

Figure 1:
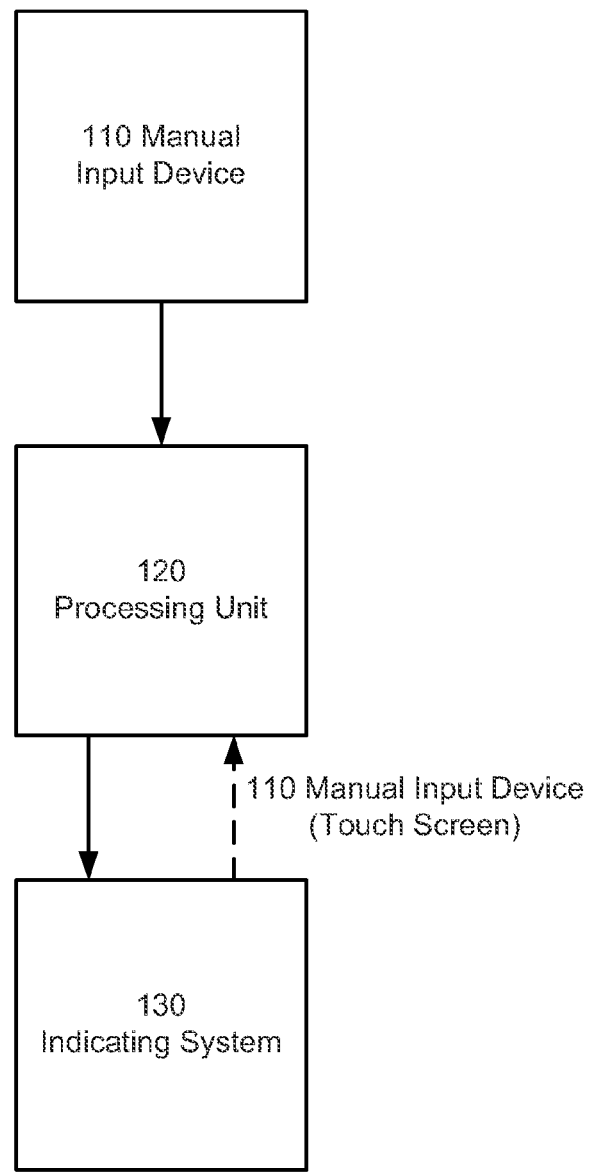

FIG. 1 depicts a location pointer system 100 suitable for implementation of the techniques described herein. The system may be comprised of a manual input device 110, a processing unit 120, and an indicating system 130.

In an embodiment of FIG. 1, the manual input device 110 could comprise any source for facilitating a viewer's interaction with the information displayed by a display unit. The manual input device 110 may include any device that allows for the selection of one or more locations presented in an image. Such devices could include, but are not limited to, a tactile device (e.g., keyboard, control display unit, cursor control device, stylus, electronic grease pen, handheld device, touch screen device, notebook, tablet, electronic flight bag, etc. . . . ) and/or speech recognition systems. The manual input device 110 could be integrated with a display unit if it is configured to receive pilot input (e.g., handheld device, touch screen device, notebook, tablet, etc. . . . ). As embodied herein, the manual input device 110 may provide input representative of a viewer's selection to the processing unit 120.

In an embodiment of FIG. 1, the processing unit 120 may receive input data from various systems including, but not limited to, manual input device 110. The processing unit 120 may be operatively coupled to these to facilitate the receiving of input data; as embodied herein, operatively coupled may be considered as interchangeable with electronically coupled. It is not necessary that a direct connection be made; instead, such receiving of input data and providing of output data could be provided through a data bus or through a wireless network. The processing unit 120 may also be operatively coupled to the indicating system 130 to facilitate the providing of output data generated by the processing unit 120.

In an embodiment of FIG. 1, the processing unit 120 may be representative of any electronic data processing unit or complex of processing units which execute software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The processing unit 120 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, a processor could also consist of more than one electronic data processing unit. As embodied herein, the processing unit 120 could be a processor(s) used by or in conjunction with any other system of the aircraft including, but not limited to, a processor(s) associated with the manual input device 110, the indicating system 130 (or one or more display units thereof), an SVS, an EVS, a combined SVS-EVS, or any combination thereof.

In an embodiment of FIG. 1, the indicating system 130 could be comprised of any display unit having a display surface on which an image(s) may be presented to the pilot. The display unit could be, but is not limited to, a Primary Flight Display ("PFD") Unit, Navigation Display ("ND") Unit, Head-Up Display ("HUD") Unit, Head-Down Display ("HDD") Unit, Multi-Purpose Control Display Unit, Engine Indicating and Crew Alerting System Unit, Electronic Centralized Aircraft Monitor Unit, Multi-Function Display, Side Display Units, and/or Data Link Control Display Unit. As embodied herein, the indicating system 130 could be comprised of a first display unit and/or a second display unit.

Figure 2A:
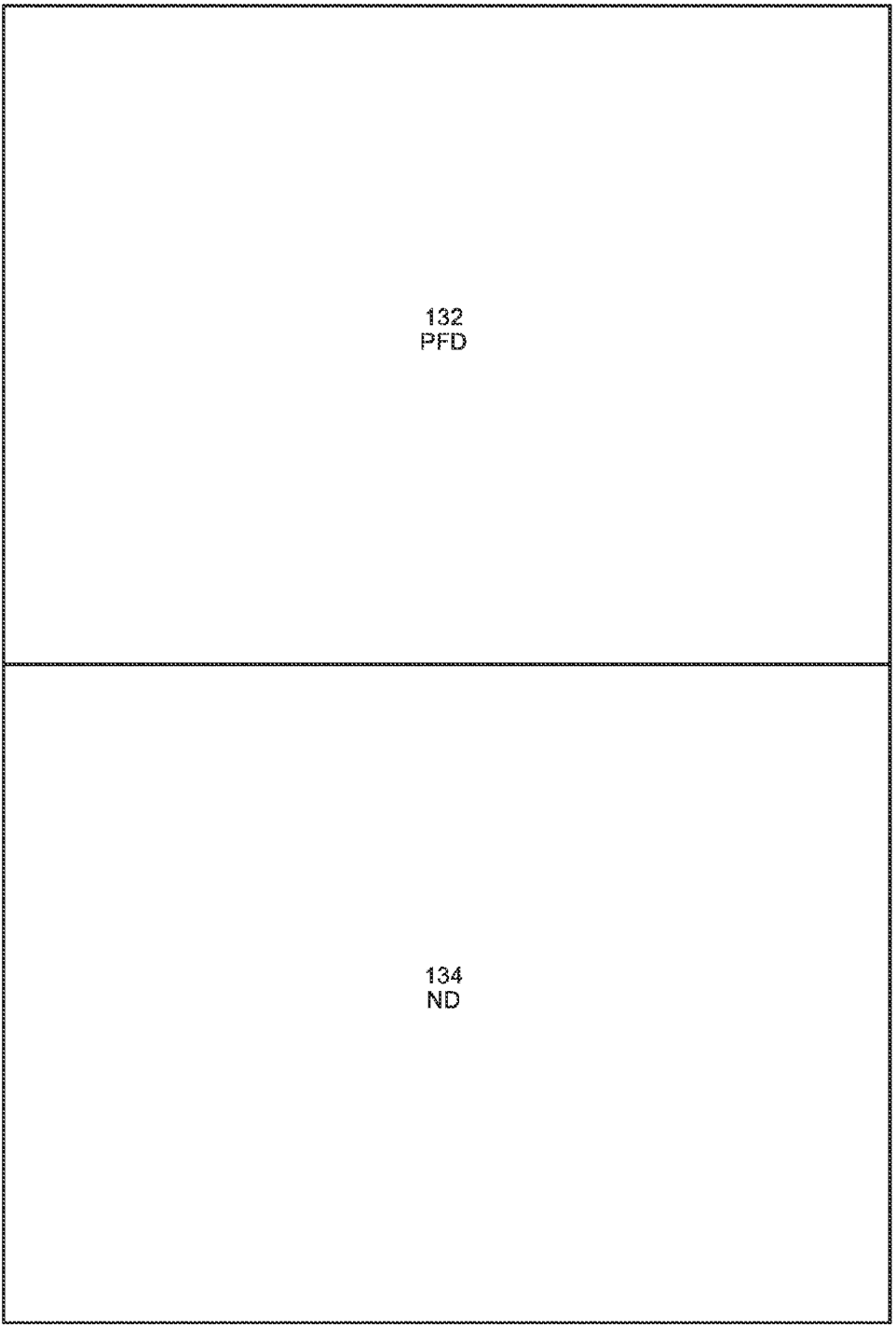
FIG. 2A depicts a configuration layout for the display of images on a display unit.

The first display unit and/or the second display unit may be configured to present one or more display(s) or image(s); as embodied herein, the terms "display" and "image" are interchangeable and treated synonymously. Referring to FIG. 2A, a display unit has been configured to present two images or displays: the tactical display comprised of a PFD 132, and the strategic display comprised of an ND 134. Alternatively, two display units may be configured to present separate images, where the first display unit presents a tactical display and the second display unit presents a strategic display. Although the following discussion will be drawn to a single display unit presenting both a tactical display and a strategic display, the embodiments herein may be applied to multiple display units.

The tactical display could be comprised of any image presented on a display unit which presents tactical information to the crew relative to the instant or immediate control of the aircraft, whether the aircraft is in flight or on the ground. The tactical display unit could be presented on the HDD and/or the HUD. The HDD is typically a unit mounted to an aircraft's flight instrument panel located in front of a pilot and below the windshield and the pilot's field of vision. The HUD is mounted in front of the pilot at windshield level and is directly in the pilot's field of vision. The HUD is advantageous because the display is transparent allowing the pilot to keep his or her eyes "outside the cockpit" while the display unit provides tactical flight information to the pilot.

Figure 2B:
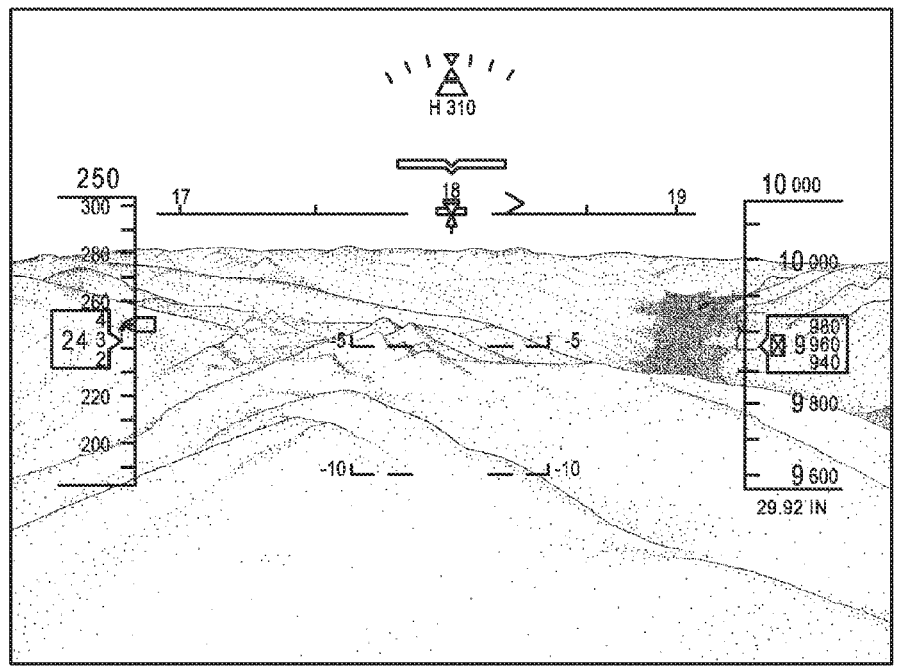
FIG. 2B depicts a tactical display presenting primary flight director symbology against an egocentric image.

The tactical display could present the same information that may be found on the PFD 132, such as "basic T" information (i.e., airspeed, attitude, altitude, and heading). Referring to FIG. 2B, this information may be presented as symbology presented against an egocentric image of a three-dimensional perspective of a scene outside the aircraft, where the image could be comprised of a synthetic image generated by a synthetic vision system ("SVS"), an enhanced image generated by an enhanced vision system ("EVS"), or a synthetic-enhanced or enhanced synthetic image generated by a combined SVS-EVS. Although it may provide the same information as that of the PFD 132, the tactical display may be configured to display additional information known to those skilled in the art including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display is designed to provide flexible configurations which may be tailored to the desired configuration specified by a buyer or user of the aircraft.

Figure 2C:
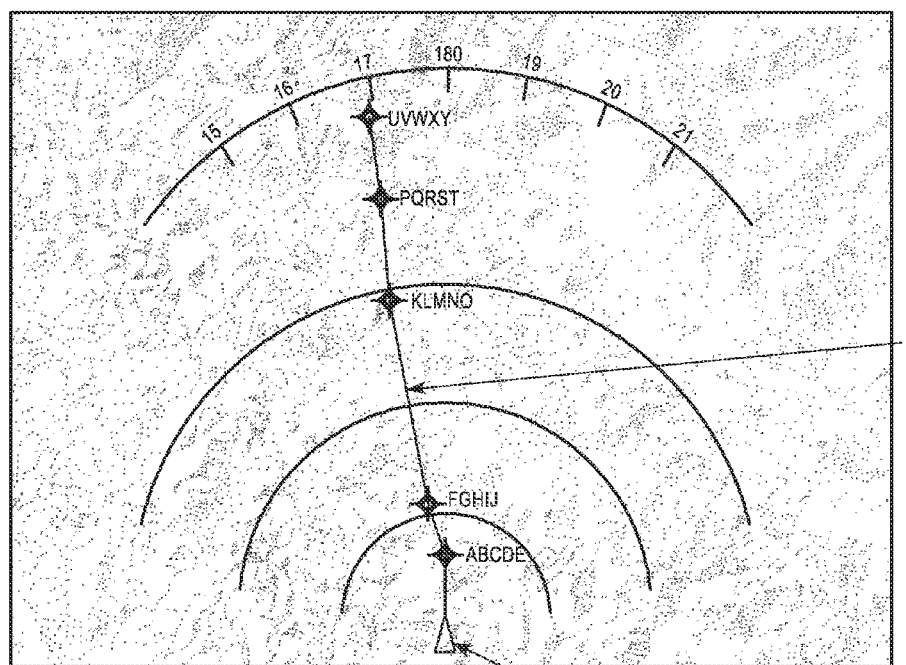
FIG. 2C depicts a strategic display presenting navigation display symbology against a plan view image.

The strategic display could be comprised of any image which presents strategic information to the crew relative to the intended future state(s) of the aircraft (e.g. intended location in space at specified times) along with information providing contextual and/or feature information to the crew (e.g. navigation aids, airspace boundaries, terrain, threats, traffic, geopolitical boundaries, etc. . . . ) about such state(s). This information may be presented as symbology presented on the ND 134 against an image of a two-dimensional bird's-eye or plan view of terrain located in front of the aircraft (i.e., ownship). Referring to FIG. 2C, the symbology comprised of ownship 136 and a flight path 138 comprised of waypoints ABODE, FGHIJ, KLMNO, PQRST, and UVWXY are presented against terrain located in front of ownship. Although not shown in FIG. 2C, those skilled in the art know that the strategic display may be configured to display the contextual and/or feature information described above. For the purposes of discussion and not limitation, the discussion herein will be drawn to a plan view of terrain.

Figure 3A:
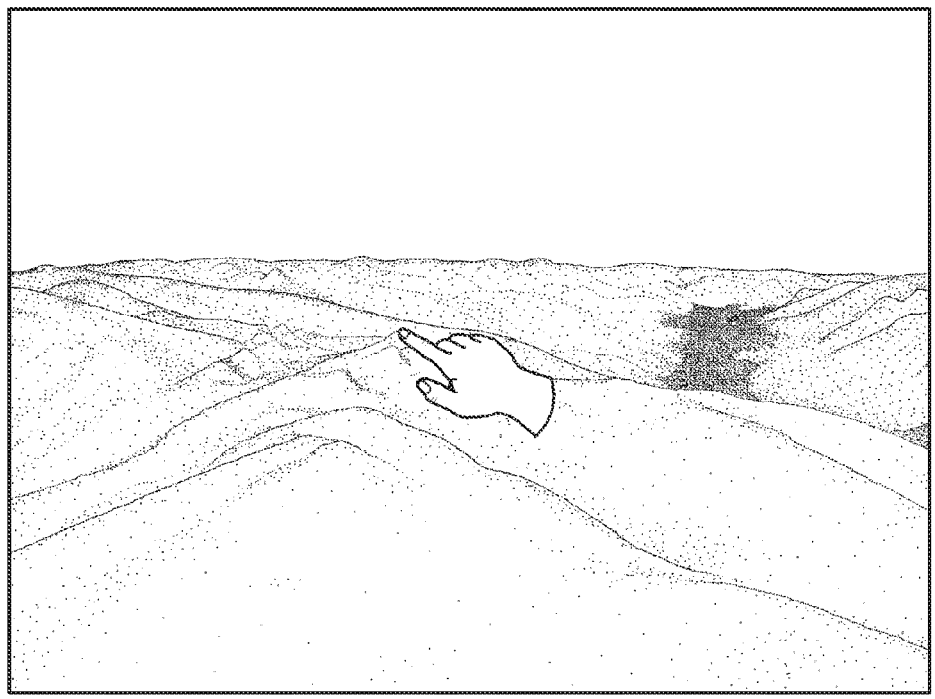
FIGS. 3A through 3C demonstrate an exemplary method in which the location of a location pointer has been determined via a user's selection on a tactical display image.
Figure 3B:
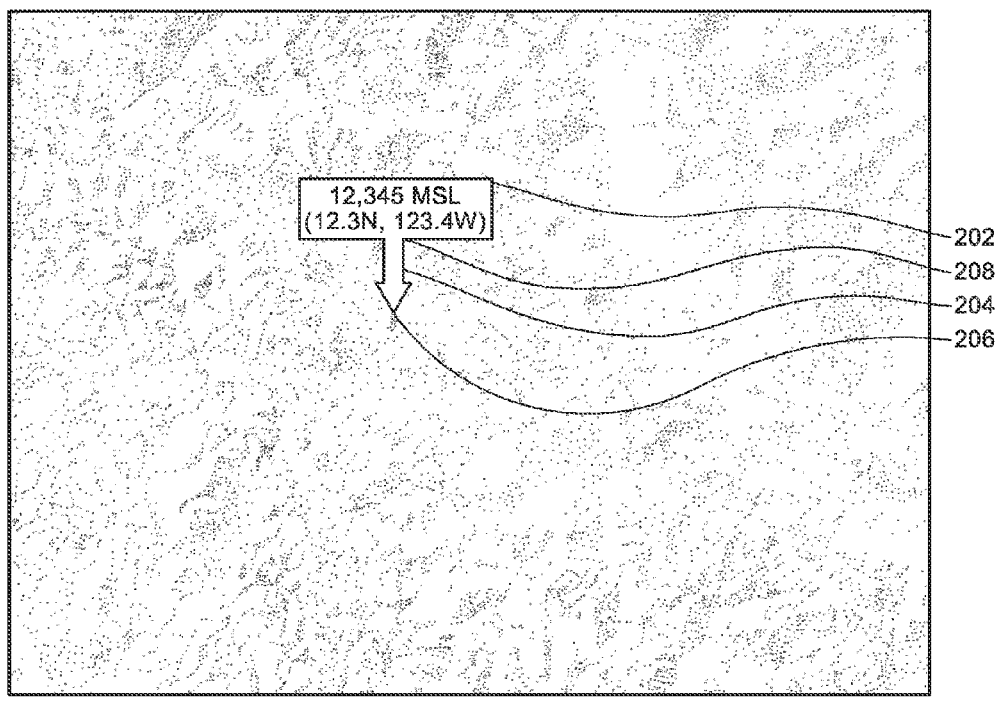
Figure 3C:
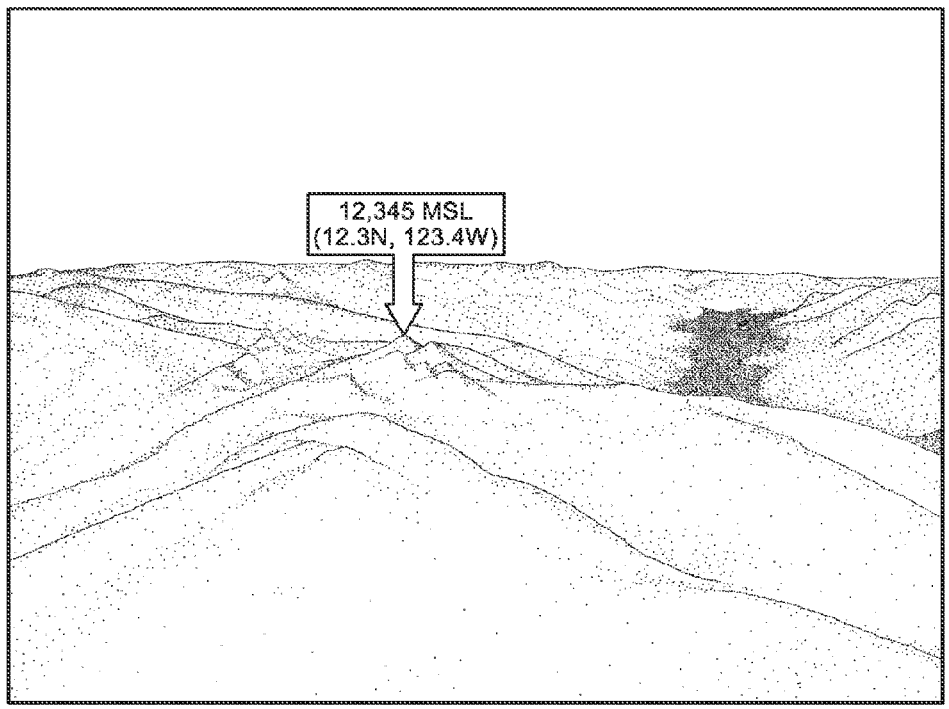

The advantages and benefits of the embodiments disclosed herein may be illustrated in FIGS. 3A through 3C by demonstrating an exemplary method in which the location of a location pointer is determined via a user's selection of a location of interest from an image. For the purpose of illustration, the manual input device 110 will be comprised of display unit integrated with a touch screen device. An image of a hand with an extended pointer finger will be used to illustrate a user's tapping of a screen as a means of inputting data representative of a selection of a location of interest from an image. It should be noted that, although the following discussion will be drawn to the selection of one location, the processing unit 120 may be programmed to receive input selections from more than one location.

Referring to FIG. 3A, the tactical display of FIG. 2B is presented on the screen. A user has inputted a location of interest by tapping the screen where it is shown. The screen coordinates (or screen location) of the input may be used to determine the image location selected by the user, from which a selected geographic location may be determined, where such determination could include the conversion of the "screen space" to "world space" and the application of a scaling component. Then, the processing unit 120 may be programmed to update a strategic image data set representative of the strategic display of FIG. 2C to include data representative of a location pointer corresponding to the selected geographic location by the user. As shown in FIG. 3B, a location pointer is shown as extending from the selected geographic location in the strategic display.

A location pointer could include any object comprised of an informational placard 202, an extension with one or more segments 204, a proximal end portion of the extension 206, and a distal end portion of the extension 208. Referring to FIG. 3B, the informational placard may be the rectangle which contains "12,345 MSL (12.3N, 123.4W)," assumed geographical information corresponding to the selected geographic location. The distal end may be located at the top of the arrow that intersects the bottom of the placard, the proximal end may be located at the tip of the arrowhead, and the extension may be located in between both ends. As embodied herein, the informational placard could be configured to provide any information to the pilot or flight crew related to the selected geographic location. For example, instead of providing geographical information, other information could be presented such as the distance and bearing to the selected geographic location.

In addition to updating the strategic image data set, the tactical image data set may also be updated. After the user of FIG. 3A has tapped the screen as shown therein and once the selected geographic location has been determined, the processing unit 120 may be programmed to update the tactical image data set with data representative of the location pointer corresponding to the selected geographic location as shown in FIG. 3C.

Figure 4A:
FIGS. 4A through 4C demonstrate an exemplary method in which the location of a location pointer has been determined via a user's selection on a strategic display image.
Figure 4B:
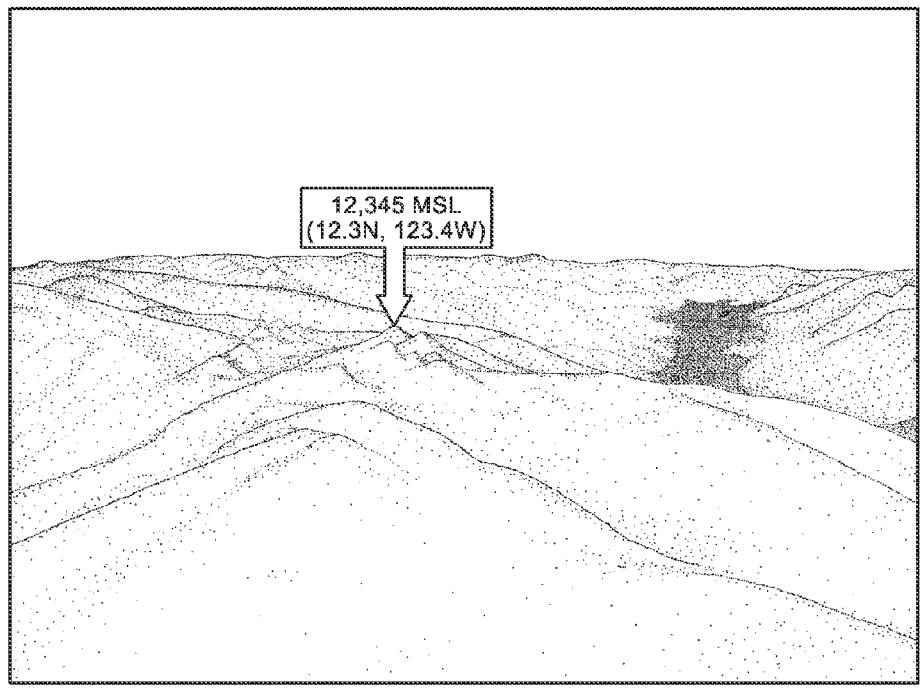

The embodiments herein are not limited to input received via a tactical display. Referring to FIG. 4A, a user has inputted a location of interest in the strategic display by tapping the screen where it is shown. After the selected geographic location has been determined, the processing unit 120 may be programmed to update the tactical image data set to include data representative of a location pointer corresponding to the selected geographic location. As shown in FIG. 4B, a location pointer is shown as extending from the selected geographic location in the tactical display.

Figure 4C:
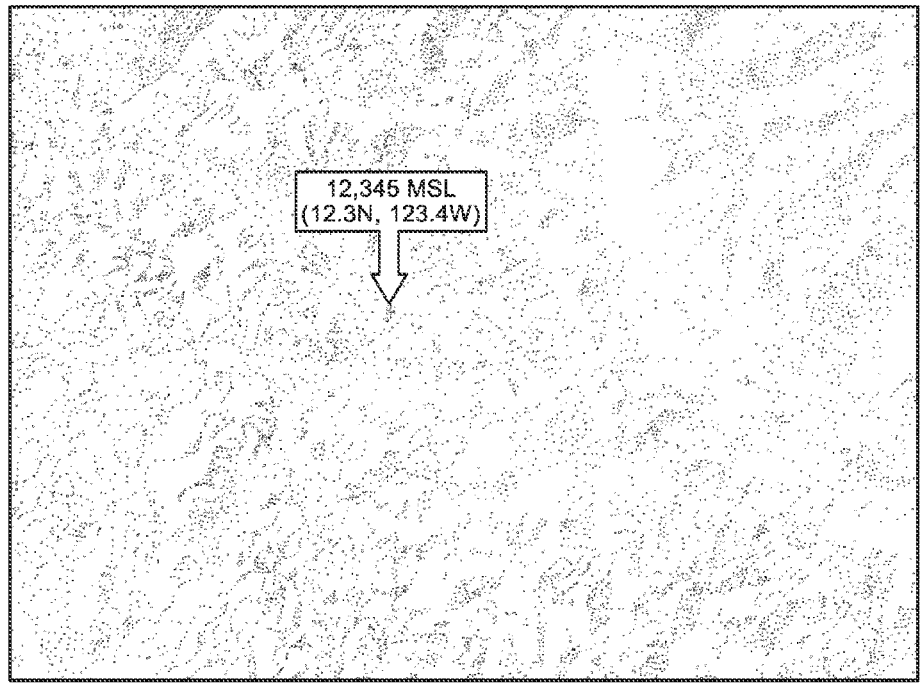

In addition to updating the tactical image data set, the strategic image data set may also be updated. After the user of FIG. 4A has tapped the screen as shown therein and once the selected geographic location has been determined, the processing unit 120 may be programmed to update the strategic image data set with data representative of the location pointer corresponding to the selected geographic location as shown in FIG. 4C.

A location pointer is not limited to a "pointer" pointing to a location; instead, the location pointer may be comprised of other forms such as the location marker disclosed by Yum et al in U.S. Pat. No. 8,094,188 entitled "System, Apparatus, and Method for Enhancing the Image Presented on an Aircraft Display Unit through Location Highlighters" ("the Yum reference") and by Frank et al in U.S. Pat. No. 8,099,234 entitled "System, Apparatus, and Method for Generating Location Information on an Aircraft Display Unit Using Location Markers," ("the Frank reference"). Moreover, besides presenting a location pointer, a location highlighter that is disclosed in the Yum reference and the Frank reference may be presented as well.

Figure 5A:
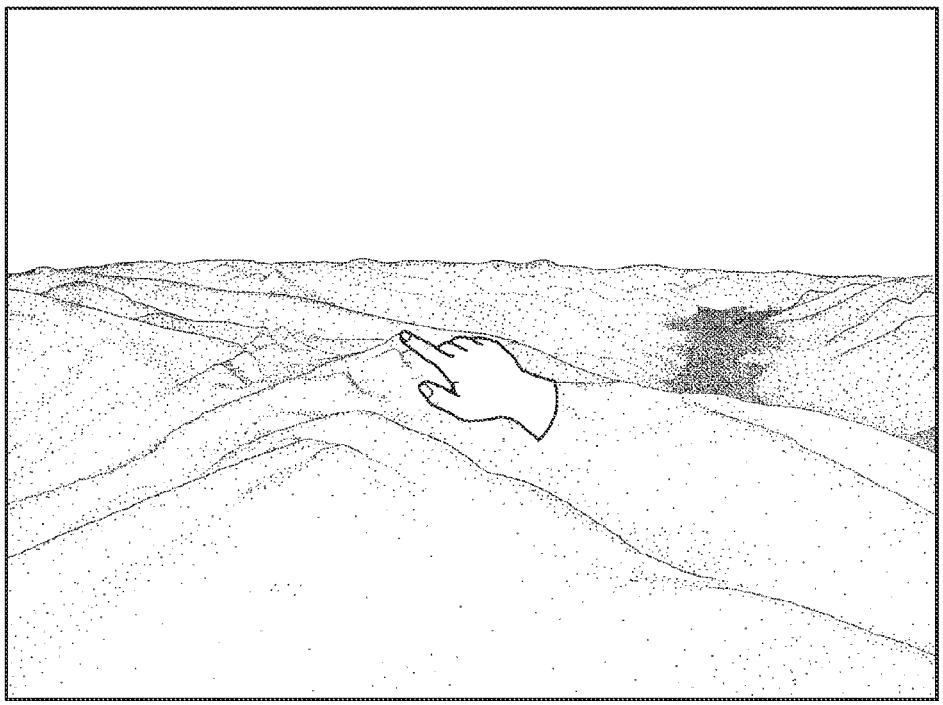
FIGS. 5A through 5C demonstrate an exemplary method in which the location of a location marker and/or location highlighter has been determined via a user's selection on a tactical display image.
Figure 5B:
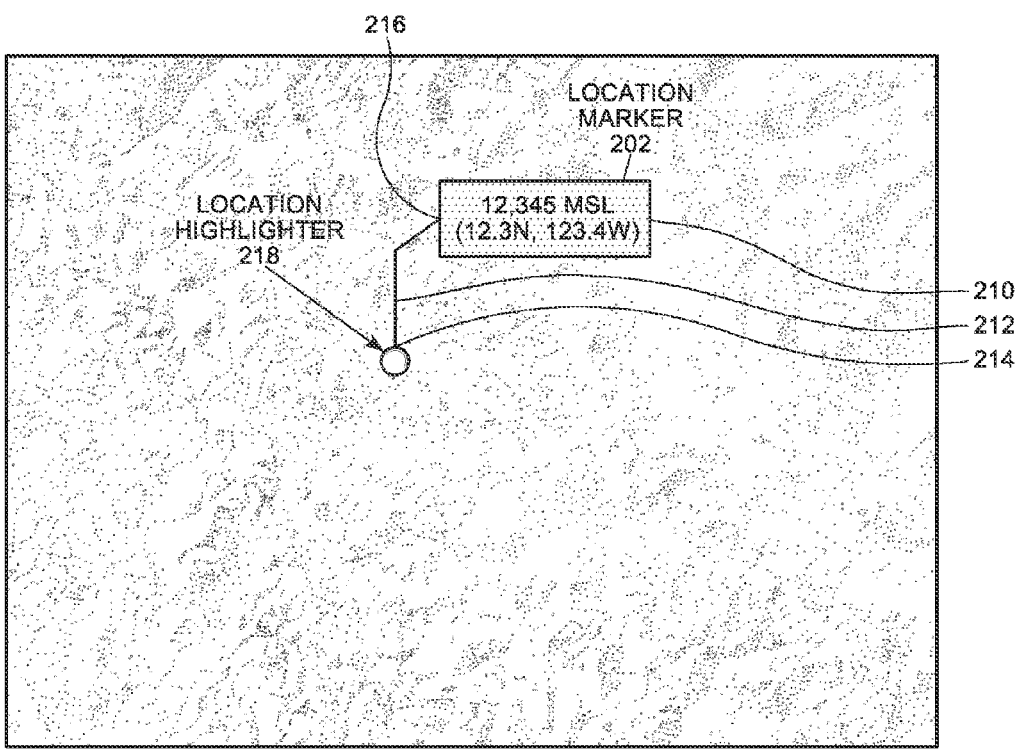

Referring to FIG. 5A, a user has inputted a location of interest in the tactical display by tapping the screen where it is shown. After the selected geographic location has been determined, the processing unit 120 may be programmed to update the strategic image data set to include, as shown in FIG. 5B, data representative of the location marker comprised of an informational placard 210, an extension with one or more segments 212, a proximal end portion of the extension 214, and a distal end portion of the extension 216 corresponding to the selected geographic location. Also, the processing unit 120 may be programmed to further update the strategic image data set to include data representative of the two-dimensional location highlighter 218 corresponding to the selected geographic location as shown in FIG. 5B.

Figure 5C:
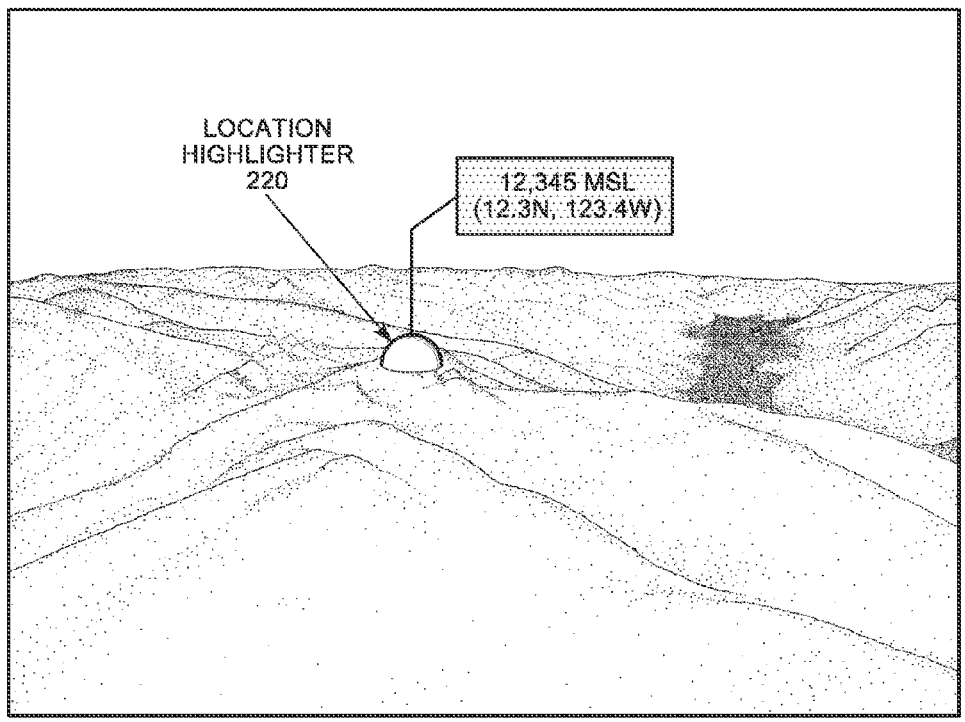

In addition, after the user of FIG. 5A has tapped the screen as shown therein and once the selected geographic location has been determined, the processing unit 120 may be programmed to update the tactical image data set to include data representative of the location marker and corresponding to the selected geographic location as shown in FIG. 5C. Also, the processing unit 120 may be programmed to update the tactical image data set to include data representative of the three-dimensional location highlighter 220 corresponding to the selected geographic location as shown in FIG. 5C.

Figure 6A:
FIGS. 6A through 6C demonstrate an exemplary method in which the location of a location marker and/or location highlighter has been determined via a user's selection on a strategic display image.
Figure 6B:
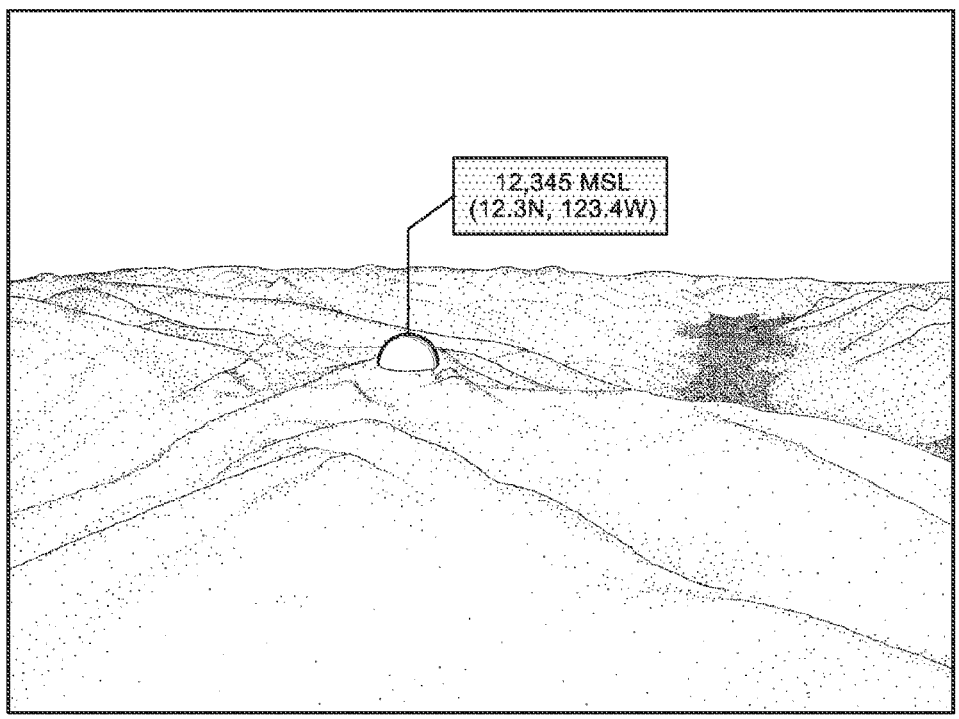

Referring to FIG. 6A, a user has inputted a location of interest in the strategic display by tapping the screen where it is shown. After the selected geographic location has been determined, the processing unit 120 may be programmed to update the tactical image data set to include data representative of the location marker corresponding to the selected geographic location as shown in FIG. 6B. Also, the processing unit may be programmed to update the tactical image data set to include data representative of the three-dimensional location highlighter corresponding to the selected geographic location as shown in FIG. 6B.

Figure 6C:
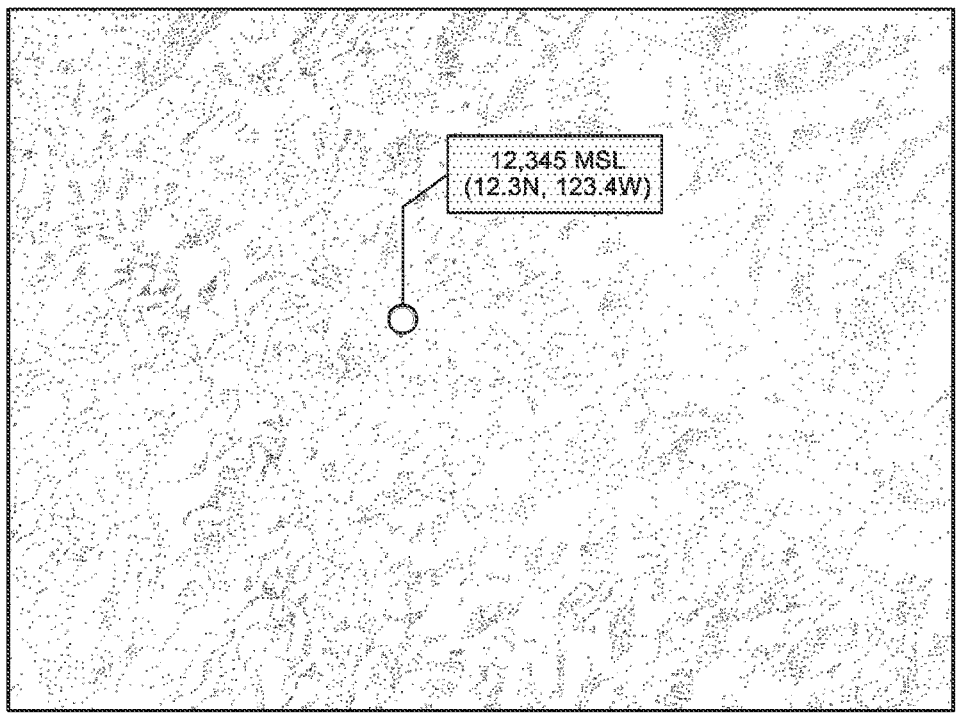

In addition, after the user of FIG. 6A has tapped the screen as shown therein and once the selected geographic location has been determined, the processing unit 120 may be programmed to update the strategic image data set to include data representative of the location marker corresponding to the selected geographic location as shown in FIG. 6C. Also, the processing unit 120 may be programmed to update the strategic image data set to include data representative of the two-dimensional location highlighter corresponding to the selected geographic location as shown in FIG. 6C.

Figure 7:
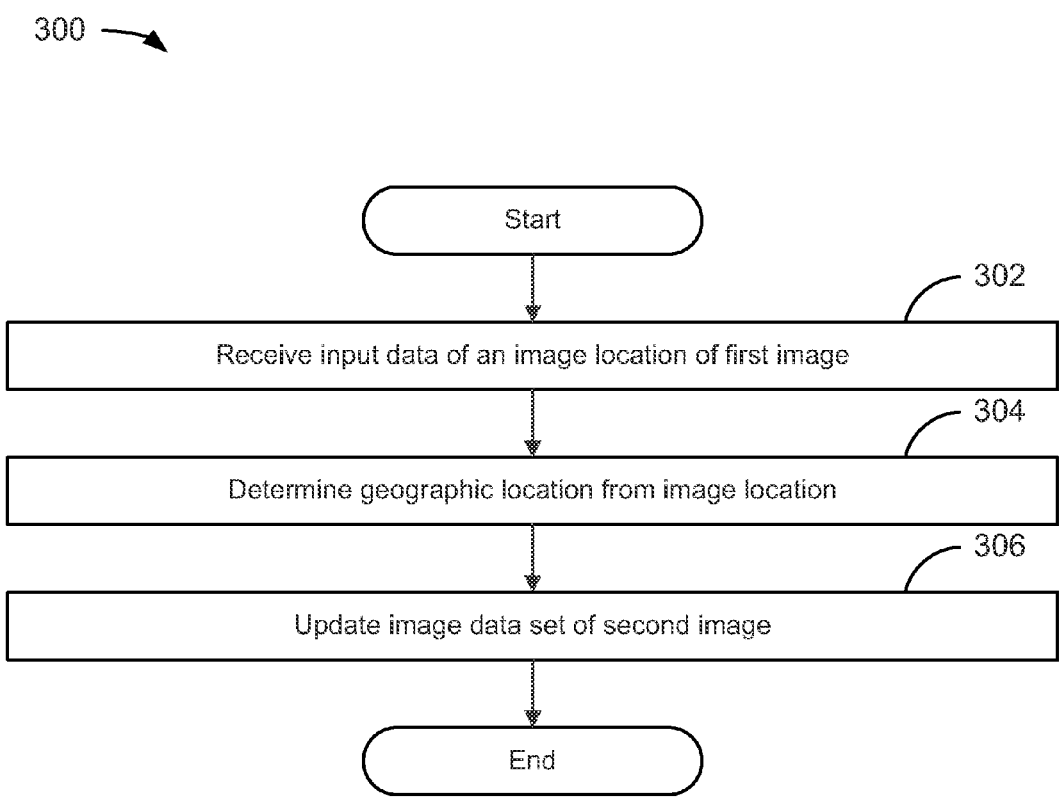
FIG. 7 depicts a flowchart of a method for generating location information.

FIG. 7 depicts flowchart 300 providing examples for generating location information presented on an aircraft display unit, where the processing unit 120 may be programmed or configured with instructions corresponding to the following modules. As embodied herein, the processing unit 120 may be a processor or complex of processors of an indicating system comprised of one or more display units. Also, the processing unit 120 may be a processor of a module such as, but not limited to, a printed circuit card having one or more input interfaces to facilitate two-way data communications between other systems and the processing unit 120, i.e., the receiving and providing of data. As necessary for the accomplishment of the following modules embodied in FIG. 7, the receiving of data is synonymous and/or interchangeable with the retrieval of data, and the providing of data is synonymous and/or interchangeable with the making available or supplying of data.

The method of flowchart 300 begins with module 302 with the receiving of input data, where the input data may have been received via the manual input device 110. The first input data could be representative of one or more selected image locations of a first image data set, where the first image data set may be representative of a first image presented on the first display unit. As embodied herein, the first display unit could be the source of manual input data if configured with a touch screen. In addition, the first image may correspond to an egocentric view or a plan view.

The method continues with module 304 with the determining of a selected geographic location for each selected image location. Each selected geographic location may correspond with the actual location of the selected image location. In one embodiment in which the aircraft's current location (i.e., aircraft's latitude/longitude information) is known, the actual location could be determined as a latitude/longitude. In another embodiment, the actual location could be determined as a bearing and distance from the aircraft's current location.

In an additional embodiment, a location data source such as a database could be included, where such data source could be comprised of location data for one or more visible and invisible objects or points of interest such as but not limited to, obstacles, airports, navigation aids, airspaces, mountain peaks, and/or any information that could be provided on an aeronautical chart. If the location data source is included, the processing unit 140 may be programmed to determine whether one or more selected locations correspond to and/or are located within close proximity to one or more points of interest stored in the data source, where the meaning of proximity may be configurable to a manufacturer and/or end-user.

The method continues with module 306 with the updating of a second image data set with first location pointer data. The second image data set may be representative of a second image presented on the second display unit, where the second image may correspond to a plan view where the first image corresponds to an egocentric view; alternatively, the second image may correspond to an egocentric view where the first image corresponds to a plan view. In addition, location pointer data could be representative of one or more first location pointers, where each first location pointer may correspond to a selected geographic location. Furthermore, the first display unit and the second display unit could be comprised of the same display unit.

In an additional embodiment, the second image data set may be updated with location highlighter data. Such data could be representative of one or more location highlighters, where each location highlighter could correspond to one selected location. In an additional embodiment, the first image data set could be updated with second location pointer data, where such data could be representative of one or more second location pointers corresponding to a selected geographic location(s).

In an embodiment in which a location data source is included, the second image data set may be updated with location pointer data and/or location highlighter data representative of one or more points of interest stored in the location data source that correspond to and/or are in close proximity of one or more of the selected locations. Then, the flowchart 300 proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such permutations, enhancements, equivalents, and improvements thereto that fall within the true spirit and scope of the present invention.

What is claimed is:

1. A system for generating location information presented on an aircraft display unit, said system comprising:
    a source of manual input data;
    a first display unit configured to present a first image represented in a first image data set, where
        the first image data set is representative of a first image of a first geographical region;
    a second display unit configured to present a second image represented in a second image data set, where
        the second image data set is representative of a second image of a second geographic region, where
            the first geographic region and the second geographic region at least partially overlap; and
    a processing unit configured to
        receive input data via the source of manual input data, where
            the input data is representative of at least one selected image location, where
                each selected image location is a selection of an image location of the first image data set,
        determine a selected geographic location for each selected image location, and update the second image data set to include first location pointer data, where
            the first location pointer data is representative of at least one first location pointer, where
                each first location pointer corresponds to one selected geographic location.

2. The system of claim 1, wherein the source of manual input data is the touch screen of the first display unit.

3. The system of claim 1, wherein the first display unit and the second display unit are the same display unit.

4. The system of claim 1, wherein
    the first image corresponds to a plan view, and
    the second image corresponds to an egocentric view.

5. The system of claim 1, wherein
    the first image corresponds to an egocentric view, and
    the second image corresponds to a plan view.

6. The system of claim 1, wherein
    the second image data set is updated to include location highlighter data, where
        the location highlighter data is representative of at least one first location highlighter, and
        each location highlighter corresponds to one selected geographic location.

7. The system of claim 1, wherein
    the processing unit is further configured to
        update the first image data set to include second location pointer data, where
            the second location pointer data is representative of at least one second location pointer, and
            each second location pointer corresponds to one selected geographic location.

8. The system of claim 1, wherein
    the first image data set is updated to include location highlighter data, where the location highlighter data is representative of at least one first location highlighter, and each location highlighter corresponds to one selected geographic location.

9. A device for generating location information presented on an aircraft display unit, said device comprising:
a processing unit configured to
receive input data via a source of manual input data, where
the input data is representative of at least one selected image location, where
each selected image location is a selection of an image location of a first image data set, and
the first image data set is representative of a first image of a first geographical region;
determine a selected geographic location for each selected image location; and
update a second image data set to include first location pointer data, where
the second image data set is representative of a second image of a second geographical region, and
the first geographic region and the second geographic region at least partially overlap, such that
the first location pointer data is representative of at least one first location pointer, and
each first location pointer corresponds to one selected geographic location.

10. The device of claim 9, wherein
the first image corresponds to a plan view, and
the second image corresponds to an egocentric view.

11. The device of claim 9, wherein
the first image corresponds to an egocentric view, and
the second image corresponds to a plan view.

12. The device of claim 9, wherein
the second image data set is updated to include location highlighter data, where
the location highlighter data is representative of at least one first location highlighter, and
each location highlighter corresponds to one selected geographic location.

13. The device of claim 9, wherein
the processing unit is further configured to
update the first image data set to include second location pointer data, where
the second location pointer data is representative of at least one second location pointer, and
each second location pointer corresponds to one selected geographic location.

14. The device of claim 9, wherein
the first image data set is updated to include location highlighter data, where
the location highlighter data is representative of at least one first location highlighter, and
each location highlighter corresponds to one selected geographic location.

15. A method for generating location information presented on an aircraft display unit, said method comprising:
receiving input data via a source of manual input data, where
the input data is representative of at least one selected image location, where
each selected image location is a selection of an image location of a first image data set, and
the first image data set is representative of a first image of a first geographical region;
determining a selected geographic location for each selected image location; and
updating a second image data set to include first location pointer data, where
the second image data set is representative of a second image of a second geographical region, and
the first geographic region and the second geographic region at least partially overlap, such that
the first location pointer data is representative of at least one first location pointer, and
each first location pointer corresponds to one selected geographic location.

16. The method of claim 15, wherein
the first image corresponds to a plan view, and
the second image corresponds to an egocentric view.

17. The method of claim 15, wherein
the first image corresponds to an egocentric view, and
the second image corresponds to a plan view.

18. The method of claim 15, wherein
the second image data set is updated to include location highlighter data, where
the location highlighter data is representative of at least one first location highlighter, and
each location highlighter corresponds to one selected geographic location.

19. The method of claim 15, further comprising:
updating the first image data set to include second location pointer data, where
the second location pointer data is representative of at least one second location pointer, and
each second location pointer corresponds to one selected geographic location.

20. The method of claim 15, wherein
the first image data set is updated to include location highlighter data, where
the location highlighter data is representative of at least one first location highlighter, and
each location highlighter corresponds to one selected geographic location.

* * * * *